US012612178B2

(12) United States Patent
Klauenberg

(10) Patent No.: US 12,612,178 B2
(45) Date of Patent: Apr. 28, 2026

(54) SYSTEM FOR GROUND POWER SUPPLY

(71) Applicant: Piller Group GmbH, Osterode (DE)

(72) Inventor: Armin Klauenberg, Osterode (DE)

(73) Assignee: Piller Group GmbH, Osterode (DE)

( * ) Notice: Subject to any disclaimer, the term of this patent is extended or adjusted under 35 U.S.C. 154(b) by 677 days.

(21) Appl. No.: 17/903,309

(22) Filed: Sep. 6, 2022

(65) Prior Publication Data

US 2023/0002081 A1     Jan. 5, 2023

Related U.S. Application Data

(63) Continuation of application No. PCT/EP2021/055481, filed on Mar. 4, 2021.

(30) Foreign Application Priority Data

Mar. 12, 2020     (EP) ..................................... 20162603

(51) Int. Cl.
| | |
|---|---|
| *B64D 41/00* | (2006.01) |
| *B60M 7/00* | (2006.01) |
| *B64F 1/35* | (2024.01) |

(52) U.S. Cl.
CPC ............. *B64D 41/00* (2013.01); *B60M 7/003* (2013.01); *B64F 1/352* (2024.01)

(58) Field of Classification Search
CPC ...................................................... B64F 1/352
See application file for complete search history.

(56) References Cited

U.S. PATENT DOCUMENTS

| | | | | | |
|---|---|---|---|---|---|
| 4,101,100 | A | * | 7/1978 | Smith | .................... A62C 33/06 244/53 A |
| 4,658,924 | A | * | 4/1987 | Dobbie | ..................... B64F 1/22 244/50 |
| 6,382,378 | B1 | * | 5/2002 | Cornic | ..................... B60M 1/10 191/20 |
| 6,424,891 | B1 | * | 7/2002 | Sargent | .................. B64F 1/364 701/33.2 |

(Continued)

FOREIGN PATENT DOCUMENTS

| | | |
|---|---|---|
| EP | 3228546 A1 | 10/2017 |
| WO | 2019182643 A9 | 10/2019 |

OTHER PUBLICATIONS

International Preliminary Report on Patentability in related PCT Application No. PCT/EP2021/055481, mailed Sep. 22, 2022.

*Primary Examiner* — Scott A Browne
(74) *Attorney, Agent, or Firm* — Thomas I Horstemeyer, LLP

(57)     ABSTRACT

A system for ground power supply of aircraft includes at least one mobile transformer unit having a first vehicle chassis and a voltage transformer mounted on the first vehicle chassis; at least two energy stores which can be alternately connected to an input of the voltage transformer in order to supply the voltage transformer with electric energy; and a supply cable for ground power supply of one of the aircraft. The supply cable is configured to be connected to an output of the voltage transformer. Each of the at least two energy stores is part of one of at least two mobile storage units each including a second vehicle chassis. The first vehicle chassis of the transformer unit and each of the second vehicle chassis of the at least two mobile storage units are moveable on the ground independently on each other.

23 Claims, 5 Drawing Sheets

(56)                    References Cited

U.S. PATENT DOCUMENTS

| 6,894,625 | B1 * | 5/2005 | Kozma | B64F 1/352 |
| | | | | 340/687 |
| 6,923,281 | B2 * | 8/2005 | Chernoff | B62D 7/18 |
| | | | | 180/65.265 |
| 7,461,516 | B2 * | 12/2008 | Leadingham | B64F 1/34 |
| | | | | 62/239 |
| 7,484,689 | B2 * | 2/2009 | Musial | H01R 13/633 |
| | | | | 244/114 R |
| 7,682,198 | B1 * | 3/2010 | Plattner | H01R 31/06 |
| | | | | 439/652 |
| 8,000,858 | B2 * | 8/2011 | Tonegawa | B60L 3/00 |
| | | | | 191/2 |
| 8,047,555 | B2 * | 11/2011 | Mann, III | B64F 1/352 |
| | | | | 280/79.2 |
| 8,117,864 | B2 * | 2/2012 | Montminy | B64F 1/364 |
| | | | | 62/419 |
| 8,134,244 | B2 * | 3/2012 | Wurth | B64F 1/352 |
| | | | | 290/1 R |
| 8,405,249 | B2 * | 3/2013 | Leadingham | H02M 7/217 |
| | | | | 307/73 |
| 8,558,505 | B2 * | 10/2013 | Iwata | B60L 53/67 |
| | | | | 191/4 |
| 9,413,264 | B2 * | 8/2016 | Ratnaparkhi | B64F 1/352 |
| 10,124,911 | B2 * | 11/2018 | Rheaume | B64F 1/225 |
| 10,322,823 | B2 * | 6/2019 | Tengman | B64F 1/362 |
| 10,483,889 | B2 * | 11/2019 | Herbener | H02J 3/241 |
| 10,543,934 | B2 * | 1/2020 | Moes | B64F 1/34 |
| 10,974,724 | B1 * | 4/2021 | Shively | B60W 10/06 |
| 2003/0127255 | A1 * | 7/2003 | Hammonds | B62D 11/06 |
| | | | | 280/830 |
| 2007/0235587 | A1 * | 10/2007 | Delort | B64F 1/352 |
| | | | | 244/114 R |
| 2015/0084344 | A1 * | 3/2015 | Turner | F03G 7/083 |
| | | | | 290/1 D |
| 2015/0274323 | A1 * | 10/2015 | Loignon | H01M 8/0494 |
| | | | | 180/53.5 |
| 2018/0134413 | A1 | 5/2018 | Halsey et al. | |
| 2018/0351193 | A1 * | 12/2018 | Bahar | H01M 8/04089 |

* cited by examiner

SYSTEM FOR GROUND POWER SUPPLY

CROSS REFERENCE TO RELATED APPLICATIONS

This application is a continuation of International Application PCT/EP2021/055481 with an international filing date of Mar. 4, 2021 and claiming priority to European Patent Application No. EP 20 162 603.3 entitled "System zur Bodenstromversorgung", filed on Mar. 12, 2020.

FIELD OF THE INVENTION

The present invention generally relates to a system for ground power supply of aircraft.

Usually, aircraft comprise own generators for power supply. These generators may be driven by the engines of the aircraft. Often, separate combustion engines are provided for driving the generators. Preferably, however, the power supply of aircraft on the ground is not provided by the own generators of the aircraft to avoid operation of the engines or the separate combustion engines and the emissions associated therewith. Instead, often special systems are used for ground power supply of aircraft on airports, which stand out because of low emissions with regard to both materials and acoustics,

BACKGROUND OF THE INVENTION

Known systems for ground power supply of aircraft comprise mobile units which each include a combustion engine and a generator driven by the combustion engine and, if needed, also a voltage converter for adapting a voltage output by the generator to the needs of the respective aircraft, wherein these components are arranged on a common vehicle chassis. These units are brought into the neighborhood of the aircraft to be supplied with power on the ground by means of towing vehicles which are also used for other purposes on the respective airport, and then connected to the aircraft to be supplied via supply cables. As a rule, a fuel reservoir for supplying the combustion engine is also arranged on the respective vehicle chassis. In modern embodiments, these known systems produce lower emissions than the own power supplies of the aircraft. However, it is of interest to even reduce these emissions or to completely avoid them.

In further known systems for ground power supply of aircraft, mobile units are provided which comprise a battery as an energy store and a voltage converter on a common vehicle chassis. These mobile units are also brought into the neighborhood of the aircraft to be supplied with power on the ground by means of towing vehicles, and connected to the aircraft via connection cables. If the battery of such a mobile unit is exhausted, the mobile unit is exchanged for a mobile unit with a sufficiently charged battery, and moved to a charging station. The re-charging of the battery takes some time. This time is often clearly longer than the time which is needed to refill a fuel reservoir for supplying a combustion engine. Thus, typically twice as many mobile units with energy storages in form of batteries than aircraft to be supplied with power on the ground have to be provided with this known system.

At least as a concept, systems for ground power supply of aircraft by means of hydrogen fed fuel cells are also known. In mobile units comprising hydrogen fed fuel cells, the provision of the hydrogen is not without problem. For example, the provision of the hydrogen in pressure tanks is forbidden on airports for security reasons. Known metal hydride stores for low pressure storage of hydrogen for mobile units comprising hydrogen fed fuel cells are associated with the drawbacks that metal hydride stores have a comparatively long filing time for refilling them with fresh hydrogen.

In a known system for ground power supply of aircraft comprising a mobile converter unit which includes a vehicle chassis and a voltage converter mounted on the vehicle chassis, two separate batteries are provided as energy stores on the same vehicle chassis, which are alternately, particularly one after the other, connectable to an input of the voltage converter. In operation of this known system for ground power supply, a supply cable from the mobile converter unit leads from an output of the voltage converter to the respective aircraft.

There still is a need of a system for ground power supply of aircraft which is at least essentially free of emissions in operation and which can nevertheless be realized at more favorable cost than known low emission systems for ground power supply of aircraft

SUMMARY OF THE INVENTION

The present invention relates to a system for ground power supply of aircraft. The system comprises at least one mobile transformer unit having a first vehicle chassis and a voltage transformer mounted on the first vehicle chassis. The voltage transformer has an input and an output. The system further comprises at least two energy stores which are configured to be alternately connected to the input of the voltage transformer in order to supply the voltage transformer with electric energy, and a supply cable for ground power supply of one of the aircraft. The supply cable is configured to be connected to the output of the voltage transformer. Each of the at least two energy stores is part of one of at least two mobile storage units each including a second vehicle chassis. The first vehicle chassis of the transformer unit and each of the second vehicle chassis of the at least two mobile storage units are configured to be moved on the ground independently on each other.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
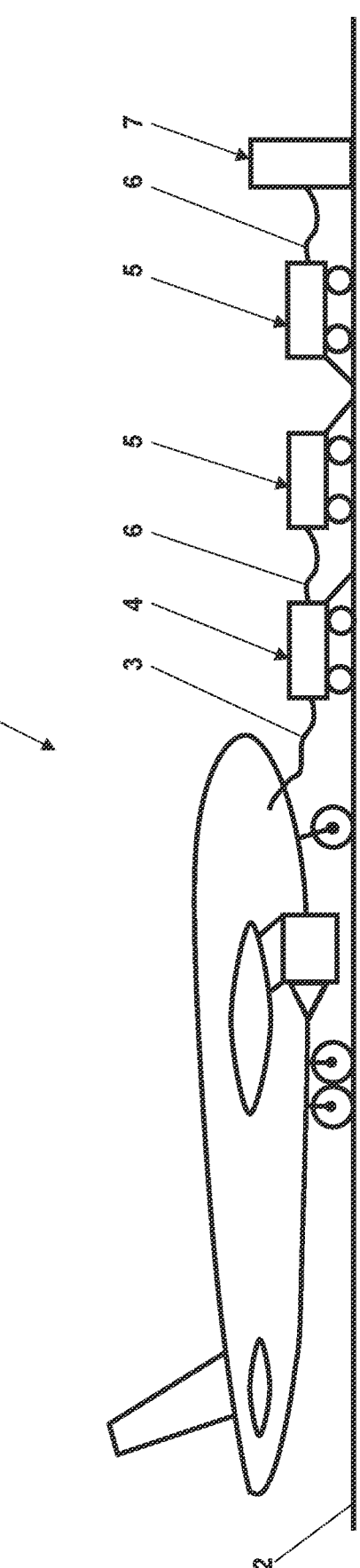
FIG. 1 is a schematic side view of a first embodiment of a system for ground power supply of aircraft according to the present disclosure.
Figure 1:

In a system for ground power supply of aircraft according to the present disclosure, the system comprising at least one mobile converter unit which includes a first vehicle chassis and a voltage converter mounted on the first vehicle chassis, and at least two energy stores which can alternately be connected to an input of the voltage transformer in order to supply the voltage transformer with electric energy, wherein a supply cable for ground power supply of one of the aircraft is connectable to an output of the voltage converter, each of the at least two energy stores is part of one of at least two mobile storage units which each include a second vehicle chassis.

That each storage unit includes a second vehicle chassis does not mean that the storage unit has two vehicle chassis but that each storage unit has a second vehicle chassis whereas the at least one converter unit has a first vehicle chassis.

Thus, in the system according to the present disclosure, the functions of voltage conversion and energy storage are distributed to different units, i.e. the converter unit and the storage units, which have separate vehicle chassis and which, correspondingly, are separately moveable. Thus, the voltage converter of the converter unit may be supplied with electric energy out of energy stores of different storage units. Particularly, one of the at least two mobile storage units may be removed from the converter unit and replaced by another of the at least two mobile storage units, if its energy store is exhausted. The exhausted energy store of the one storage unit may then be moved using the second vehicle chassis of this storage unit to a location remote from the converter unit and be recharged there, whereas the converter unit is supplied out of the not yet exhausted energy store of the other storage unit. If this energy store is exhausted, a further exchange of the storage units may take place, because, typically, this is only the case when the energy store of the one storage unit has already been recharged even if this takes a certain period of time. With very long periods of time for recharging the energy store, three or more storage units may be provided instead of the at least two storage units so that the energy stores of two or more of these storage units may simultaneously be recharged, whereas one further storage unit ensures the supply of the voltage converter of the converter unit with electric energy by means of its energy store.

The investment needed for realizing the system according to the present disclosure is thus restricted to what is technically practically necessary, i.e. to one converter unit per aircraft to be supplied at the same time and to so many storage units as alternately needed for a permanent supply of the voltage converters of the converter units with electric energy. Particularly, in the operation of the system according to the present disclosure, no voltage converters that are not needed in charging the energy stores are moved around with the storage units for charging the energy stores of the storage units. Each of the mobile units of the system according to the present disclosure is completely focused to its respective task of storing energy or converting voltage and thus of limited overall complexity. In practice, one converter unit and one energy supply unit of the system according to the present disclosure may often be provided at even lower cost than a known mobile unit comprising a voltage converter and an energy store. Particular high savings result from the system according to the present disclosure if only one converter unit and two energy storage units are used in the system according to the present disclosure instead of two known mobile units with voltage converter and energy store.

Typically, in the system according to the present disclosure, the energy stores are each connectable to the input of the voltage converter via a connection cable leading from the respective storage unit to the converter unit. Such a connection cable provides for a certain flexibility with respect to relative positioning of the storage unit with respect to the converter unit.

It will be understood that, as a rule, at least one charging unit is present in the system according to the present disclosure, to which the energy stores are alternately connectable. As a general rule, this charging unit is stationary, in contrast to the at least one converter unit and the at least two storage units.

The energy stores of the at least two storage units may either include an electric battery, or a fuel cell and a fuel reservoir. In other words, the respective energy store may either be an electric battery or a so called fuel cell battery. In both cases, the energy store, as a whole, is an electrochemical energy store.

Independently on the design of the energy stores of the storage units as electric batteries or fuel cell batteries, the converter unit may be the same, i.e. suitable both for usage with storage units comprising electric batteries and for usage with storage units comprising hydrogen batteries.

The fuel reservoir of the fuel cell batteries is preferably a metal hydride store to be able to store hydrogen as fuel for the low-emission operation of the fuel cell at as little pressure as possible. In the system for ground power supply of aircraft according to the present disclosure, the long filling times of a metal hydride store are no problem due to the higher number of storage units as compared to the number of converter units.

If the energy stores of the at least two storage units each comprise an electric battery, the energy stores may each be connectable to the charging unit via the first connection cable via which the energy stores are also connectable to the voltage converter, or via a second connection cable, wherein the respective connection cable leads from the storage unit to the charging unit. Further, the at least one charging unit may be configured for an input side connection to a local or public power grid.

If, on the other hand, the energy stores of the at least two storage units each comprise a fuel cell and a fuel reservoir, it is preferred if the charging unit is not only provided for refilling the fuel reservoir but also for regenerating the fuel cell. Often, fuel cells can be regenerated with respect to their efficiency by subjecting them to a certain sequence of voltages. Correspondingly, the charging unit is preferably configured for applying such a sequence of voltages to the respective fuel cell. It will be understood that the storage units of the system for ground power supply of aircraft according to the present disclosure, as a rule, do not only comprise a single but several fuel cells, typically a so-called fuel cell stack such that they can provide sufficient electric power.

Independently on whether the storage units include electric batteries or full cell batteries, the at least two mobile storage units of the system according to the present disclosure may each be devoid of voltage converters, particularly devoid of voltage converters for electric power output by the energy stores and, in case of an electric battery as an energy store, also for electric power to be fed into the battery for charging it.

Storage units of the system for ground power supply of aircraft according to the present disclosure, which are suitable for application in a commercial airport, have storage capacities in the range from 20 kWh to 300 kWh. More particular, storage units with storage capacities between 80 kWh and 100 kWh are usable without permanent exchange but nevertheless quickly rechargeable and available at acceptable cost.

The at least one converter unit of the system according to the present disclosure may be completely devoid of energy sources for the ground power supply of one of the aircraft. This does, however, not exclude that the converter unit has a buffer store at the input of the voltage converter, like for example a dc voltage link having a high electric capacity to bridge an exchange of a storage unit with exhausted energy store for a storage unit with a fresh energy store. However, as a rule, the converter unit does not comprise an electrochemical energy store for the ground power supply of one of the aircraft. On the other hand, also as a rule, the converter unit will comprise an electrochemical energy store for supplying a controller of the converter unit and the like.

In order to allow for a trouble-free change between different storage units during ground power supply of an aircraft by means of the converter unit, the at least one converter unit of the system according to the present disclosure may comprise a alternating switch which alternately connects two connectors, which are each provided for one of the at least two storage units, to the input of the voltage converter of the at least one converter unit. Herein, the connection of the respective aircraft via the supply cable to the converter unit persists which is at any time connected to one of the storage units via a respective first connection cable and temporarily even to both of the least two storage units.

Because commercial aircraft typically have an onboard grid of an alternating voltage of 400 Hz, the voltage converter of the at least one converter unit typically has an inverter which outputs a supply alternating voltage of typically 400 Hz for the ground power supply of one of the aircraft.

The absolute number of the converter units and the storage units of a system according to the present disclosure will typically be higher than 1 and 2, respectively. This means that the at least one mobile converter unit, as a rule, is one of several equal or even identical mobile converter units of the system, and the at least two mobile storage units, as a rule, are two of many equal or even identical mobile storage units of the system, wherein per each converter unit of the several equal or even identical mobile converter units, as a rule, two of the storage units of the many equal or even identical mobile converter units are provided. In a same way, the at least one charging unit may be one of several equal or even identical charging units of the system, wherein per each converter unit of the several equal or even identical mobile converter units one of the charging units of the several equal or even identical charging units may be provided.

With respect to their first and second vehicle chassis, the converter units and the storage units may comply with a local standard of vehicle chassis of units which are movable in the surroundings of the aircraft on the ground. In any case, the first and second vehicle chassis of the converter units and the storage units may generally be equal or even identical.

Referring now in greater detail to the drawings, FIG. 1 depicts an aircraft 1 at a ground 2 which is supplied with power via a supply cable 3. The supply cable 3 leads from a mobile converter unit 4 to the aircraft 1. A mobile storage unit 5 is connected to the mobile converter unit 4 via a connection cable 6. The mobile storage unit 5 supplies the converter unit 4 with electric energy and has an energy store for this purpose. A further equal or even identical mobile storage unit 5 is connected to a stationary charging unit 7 via its connection cable 6 to charge its energy store. When the energy store of the storage unit 5 connected to the converter unit 4 is exhausted, and the energy store of the storage unit 5 connected to the charging unit 7 is charged, the storage units 5 can be exchanged, wherein, temporarily, both storage units 5 may be connected to the converter unit 4. Thus, the converter unit 4 is suitable for continuous ground power supply of aircraft 1.

Figure 2:
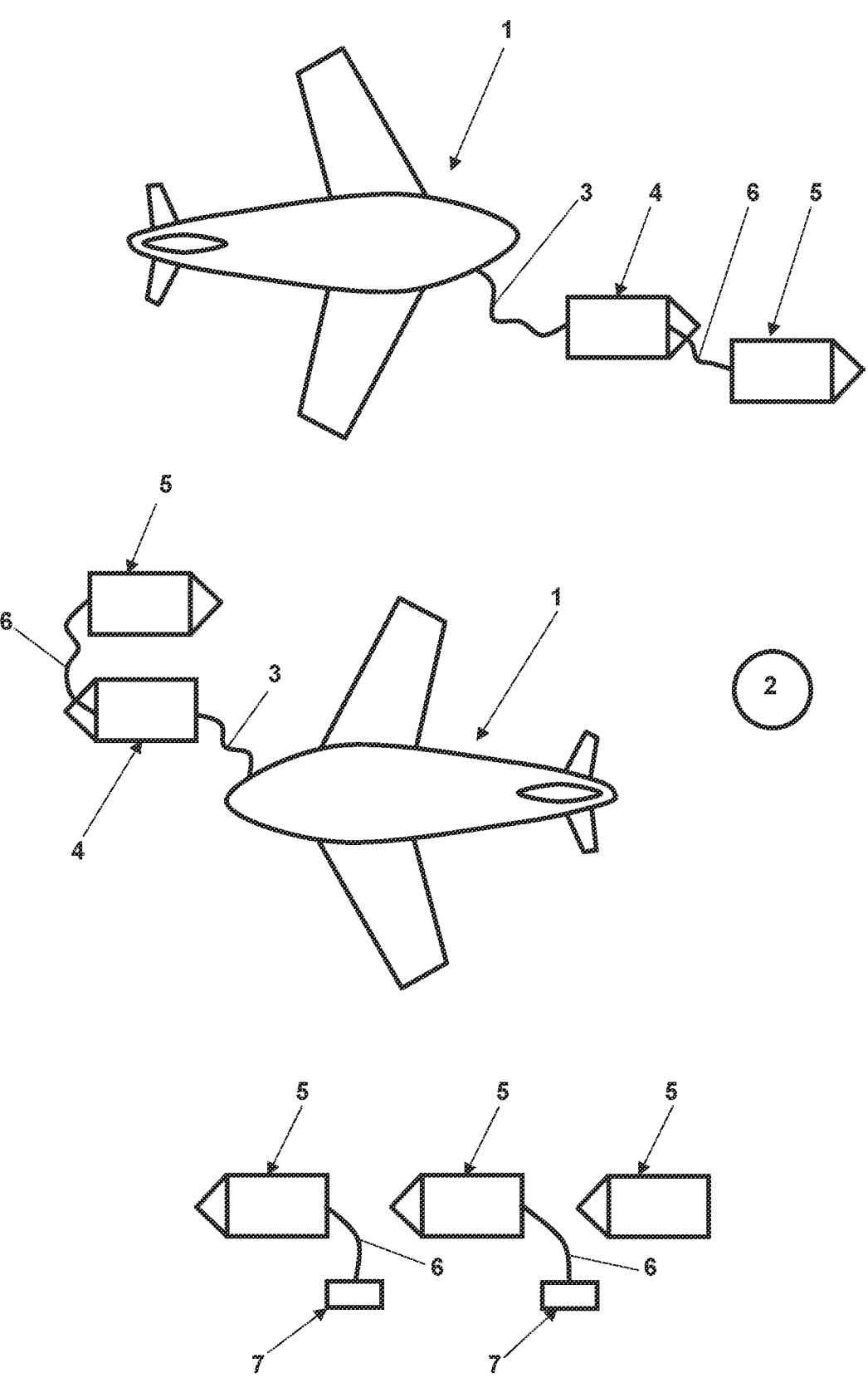
FIG. 2 is a top view of a second embodiment of the system for ground power supply of aircraft according to the present disclosure.

FIG. 2 shows a system for ground power supply of aircraft 4 with a total of two converter units 4 and five storage units 5 and two charging units 7. Here, one storage unit 5 is provided as a backup, in case that the energy store of one of the storage units 5 connected to the converter units 4 is exhausted, before the energy store of the alternately used storage unit 5 connected to the charging unit 7 is recharged. If there are more than two aircrafts 1 to be simultaneously supplied with power on the ground 2 as depicted in FIG. 2, correspondingly more converter units 4, storage units 5 and charging units 7 are to be provided.

Figure 3:
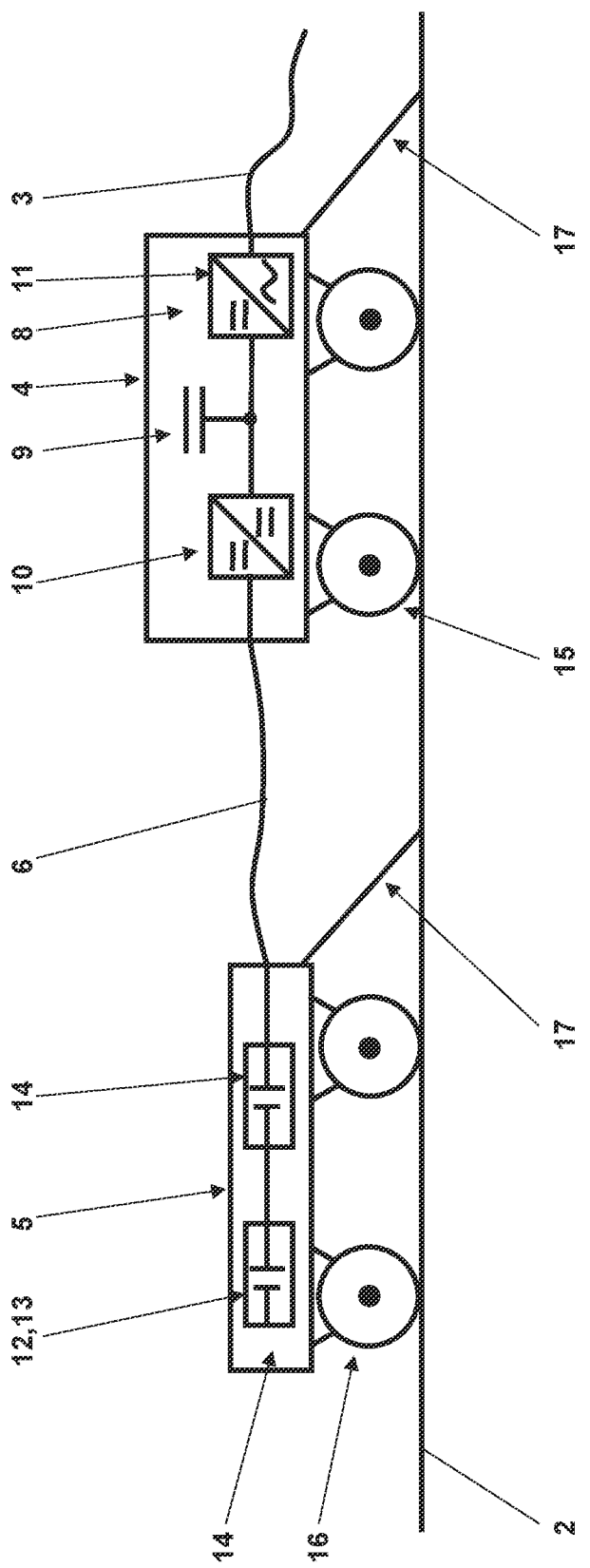
FIG. 3 illustrates a detail of a converter unit and a storage unit of a further embodiment of the system for ground power supply of aircraft according to the present disclosure.

FIG. 3 schematically illustrates the interior construction of one converter unit 4 and of one storage unit 5 connected there to. The converter unit 4 has a voltage converter 8. The voltage converter 8 includes an input side step up converter 10 which is generally optionally, a dc voltage link 9 connected to the output of the step up converter 10, and an inverter 11 connected with its input to the dc voltage link 9. For example, the inverter 11 is configured to output alternating current at a frequency of 400 Hz via the supply cable 3. The battery store 12 of the storage unit 5 is an electric battery 13 with a plurality of interconnected battery cells 14. Both units 4 and 5 comprise equal or even identical vehicle chassis 15 and 16 and can each be coupled via a tongue 17 to a towing vehicle not depicted here and moved with the towing vehicle on the ground 2.

Figure 4:
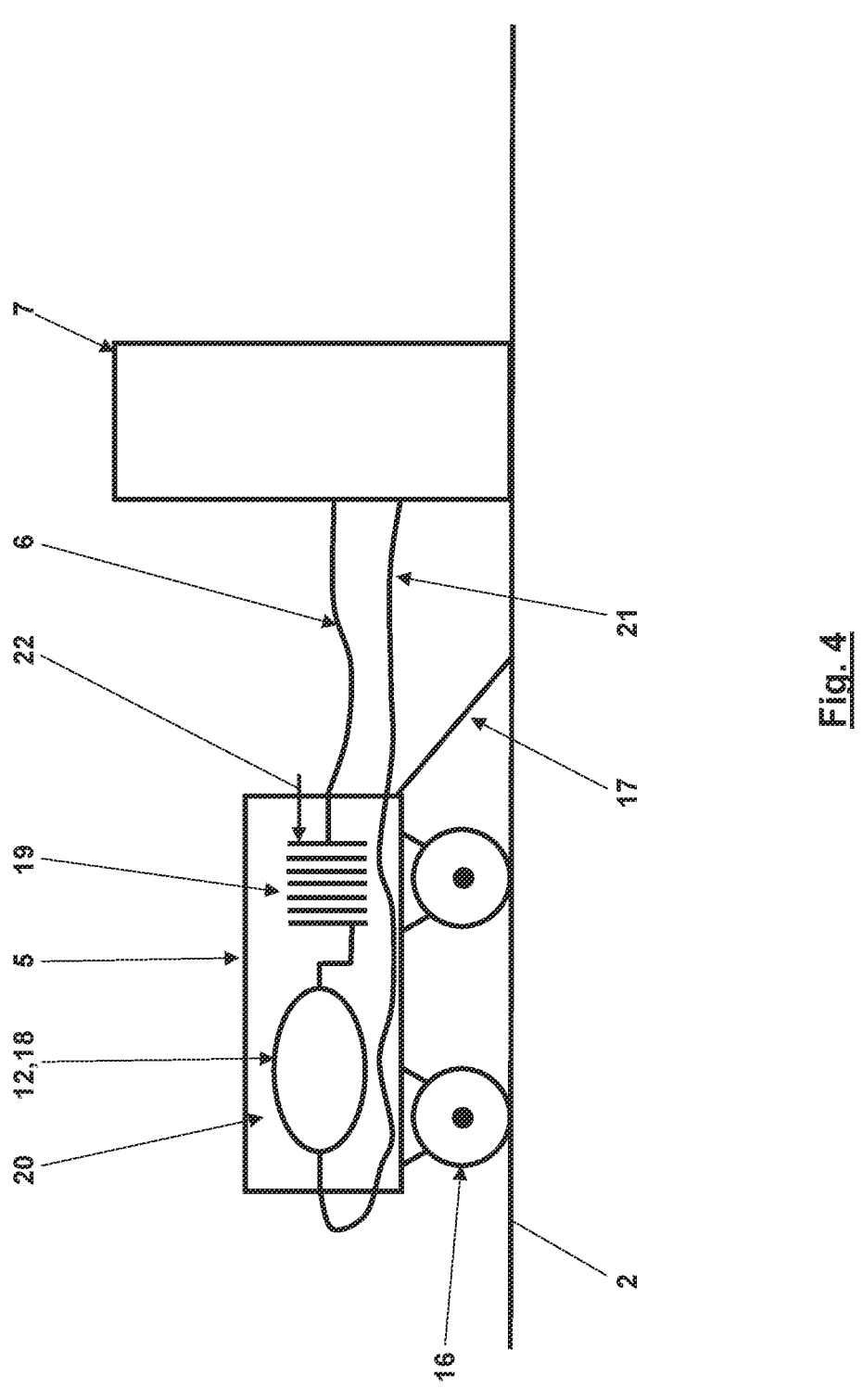
FIG. 4 illustrates details of another storage unit of the system for ground power supply of aircraft according to the present disclosure.

FIG. 4 schematically illustrates an alternative embodiment of the energy store 12 of a storage unit 5 as fuel cell battery 18 having a fuel cell 19 indicated as a fuel cell stack and a fuel reservoir 20, which particularly is a metal hydride storage for hydrogen. Not only the fuel reservoir 20 via a fuel line 21 but also the fuel cell 19 via the connection cable 6 is connected to the charging unit 7 depicted in FIG. 4. This serves for regenerating the fuel cell 19 by subjecting it to certain voltages during refilling the fuel reservoir 20. Further, the fuel cell 19 is indicated as breathing air 22 out of the surroundings.

Figure 5:
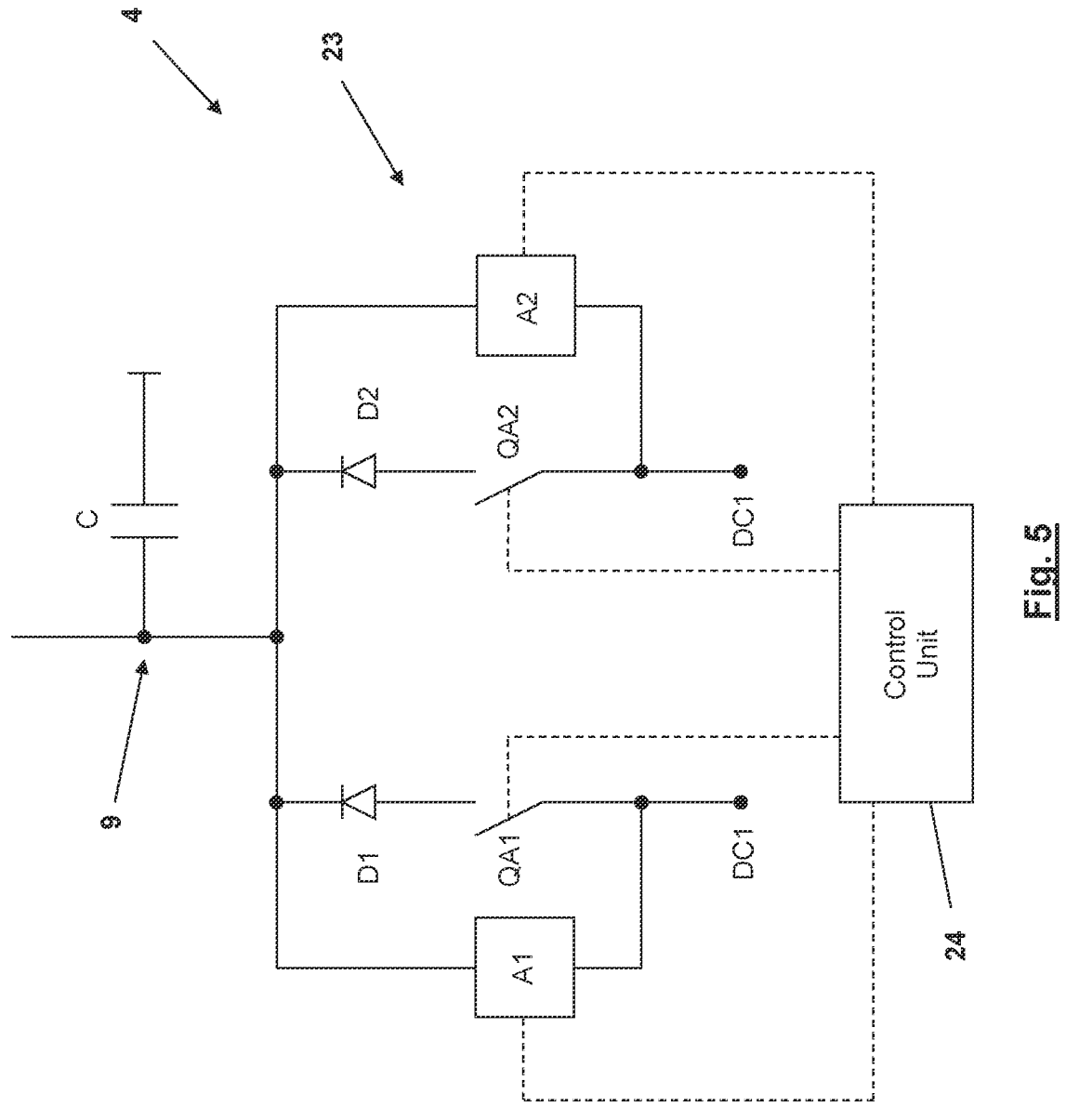
FIG. 5 illustrates details of an alternating switch of a converter unit according to the present disclosure of a further embodiment of the system for ground power supply of aircraft according to the present disclosure.

FIG. 5 illustrates an input side alternating switch 23 which is connected upstream of the input side of the dc voltage link 9 of the converter unit 4. The alternating switch may be provided as alternative or an addition to the step up converter according to FIG. 3, and, particularly, be provided at the input side of the step up converter. The alternating switch 23 has two connectors DC1 and DC2 for two storage units 5 providing direct voltages. By a control unit 24, the connectors DC1 and DC2 are alternately connected to the dc voltage link 9 via power switches QA1 and QA2, wherein the connectors DC1 and DC2 are additionally decoupled by diodes D1 and D2. Further, for each of the connectors DC1 and DC2, a pre-charging circuit A1 and A2 is provided, respectively, which includes a voltage measuring to, if necessary, pre-charge the dc voltage link 9 prior to closing the respective switch QA1 or QA2, respectively, in order to avoid over currents. The switches QA1 and QA2 may be power switches, connectors or relays. By means of the control unit 24, it is possible to switch over between two storage units 5 connected to the connectors DC1 and DC2 for charging the dc voltage link 9, without interrupting the energy supply of the voltage converter 9 connected to the dc voltage link and thus the ground power supply of the aircraft 1 connected thereto. The point in time of switching over between these storage units 5 may be set manually or according to a control program that exactly switches over when the energy storage 12 of the hitherto used storage unit 5 is exhausted, i.e. de-charged down to a defined level.

Many variations and modifications may be made to the preferred embodiments of the invention without departing substantially from the spirit and principles of the invention. All such modifications and variations are intended to be included herein within the scope of the present invention, as defined by the following claims.

What is claimed:

1. A ground power supply system for aircraft, the system comprising:
   at least one mobile transformer unit comprising:
   a first vehicle chassis; and
   a voltage transformer mounted on the first vehicle chassis, the voltage transformer having an input and an output,
   a first mobile storage unit comprising:
   a second vehicle chassis; and
   a first energy store mounted on the second vehicle chassis,
   a second mobile storage unit comprising:
   a third vehicle chassis; and
   a second energy store mounted on the third vehicle chassis, wherein:
   the first and second energy stores are configured to be alternately connected to the input of the voltage transformer to supply the voltage transformer with electric energy such that the voltage transformer and the first and second energy stores cooperate to supply continuous ground power to the aircraft;
   the mobile transformer unit is configured for providing ground power supply to one of the aircraft; and
   the first, second, and third vehicle chassis are configured to be moved on the ground independently on each other.

2. The system of claim 1, wherein each of the first and second energy stores is configured to be connected to the input of the voltage transformer via a connection cable leading from the energy store's respective mobile storage unit to the transformer unit.

3. The system of claim 1, further comprising at least one charging unit, wherein the first and second energy stores are configured to be alternately connected to the at least one charging unit.

4. The system of claim 3, wherein the at least one charging unit is stationary.

5. The system of claim 3, wherein:
   wherein each of the first and second energy stores comprises an electrical battery; and
   each of the first and second energy stores is configured to be connected to the at least one charging unit via a connection cable, wherein the connection cable leads from the energy store's respective mobile storage unit to the at least one charging unit.

6. The system of claim 3, wherein the at least one charging unit is configured to be connected to a power grid at its input site.

7. The system of claim 3, wherein each of the first and second energy stores comprises a fuel cell and a fuel reservoir.

8. The system of claim 7, wherein the fuel reservoir includes a metal hydride store.

9. The system of claim 7, wherein the charging unit is configured to regenerate the fuel cell of the respective mobile storage unit.

10. The system of claim 1, wherein the first and second mobile storage units each do not comprise a voltage transformer.

11. The system of claim 1, wherein each of the first and second mobile storage units has a storage capacity in a range from 20 kWh to 300 kWh.

12. The system of claim 1, wherein each of the first and second mobile storage units has a storage capacity in a range 80 kWh to 100 kWh.

13. The system of claim 1, wherein the at least one mobile transformer unit is devoid of any energy source for ground power supply of one of the aircraft.

14. The system of claim 1, wherein:
    the input of the voltage transformer is configured to simultaneously connect the first and second energy stores to the input of the voltage transformer during the alternation of the connection of the first and second energy stores to the voltage transformer;
    the at least one mobile transformer unit includes an alternating switch which is configured to alternately connect two connectors for each of the first and second mobile storage units with the input of the voltage transformer of the at least one mobile transformer unit.

15. The system of claim 1, wherein the voltage transformer of the at least one mobile transformer unit comprises an inverter which is configured to output a supply AC voltage for the ground power supply of one of the aircraft.

16. The system of claim 1,
    wherein the at least one mobile transformer unit is one of a plurality of substantially identical mobile transformer units of the system,
    wherein the first and second mobile storage units are two of many substantially identical mobile storage units of the system, and
    wherein at least two of the mobile storage units of the many substantially identical mobile storage units are provided for each transformer unit of the plurality of substantially identical mobile transformer units.

17. The system of claim 16, further comprising several substantially identical charging units, wherein the respective energy stores of the many substantially identical mobile storage units, including the respective energy stores of both the first and second mobile storage units and one or more additional mobile storage units, are configured to be alternately connected to the several substantially identical charging units.

18. The system of claim 3, wherein:
    the second energy store is configured to connect to the at least one charging unit to charge the second energy store as the first energy store is supplying the voltage transformer with electric energy; and
    the first energy store is configured to supply the volage transformer with electric energy until the first energy store is exhausted, at which time the first and second energy stores are exchanged so that the second energy store begins to supply the voltage transformer with electric energy to enable the voltage transformer and the first and second energy stores cooperate to supply the continuous ground power to the aircraft.

19. The system of claim 18, wherein the first and second energy stores are configured to be temporarily simultaneously connected to the input of the voltage transformer during the exchange.

20. The system of claim 1, wherein the first vehicle chassis and the second vehicle chassis are substantially identical.

21. A method of providing ground power to an aircraft, the method comprising:
  providing at least one mobile transformer unit comprising:
    a first vehicle chassis; and
    a voltage transformer mounted on the first vehicle chassis, the voltage transformer having an input and an output,
  providing a first mobile storage unit comprising:
    a second vehicle chassis; and
    a first energy store mounted on the second vehicle chassis,
  providing a second mobile storage unit comprising:
    a third vehicle chassis; and
    a second energy store mounted on the third vehicle chassis, wherein:
      the first and second energy stores are configured to be alternately connected to the input of the voltage transformer to supply the voltage transformer with electric energy;
      the mobile transformer unit is configured for providing ground power supply to one of the aircraft; and
      the first, second, and third vehicle chassis are configured to be moved on the ground independently on each other;

attaching the mobile transformer unit to charge the aircraft;
  connecting the first mobile storage unit to the mobile transformer unit so that while the mobile transformer unit is charging the aircraft, the first mobile storage unit is providing electric energy to the mobile transformer unit for use in charging the aircraft; and
  after using the first mobile storage unit to provide electric energy to the mobile transformer unit:
    connecting the first mobile storage unit to a charging unit to recharge the first mobile storage unit's energy store; and
    connecting the second mobile storage unit to the mobile transformer unit so that while the mobile transformer unit is charging the particular aircraft, the second mobile storage unit is providing electric energy to the mobile transformer unit for use in charging the aircraft.

22. The method of claim 21, further comprising:
  after using the second mobile storage unit to provide electric energy to the mobile transformer unit:
    connecting the second mobile storage unit to a charging unit to recharge the second mobile storage unit's energy store; and
    reconnecting the first mobile storage unit to the mobile transformer unit so that while the mobile transformer unit is charging the particular aircraft, the first mobile storage unit is providing electric energy to the mobile transformer unit for use in charging the aircraft.

23. The method of claim 22, wherein the transformer unit is suitable for providing a continuous supply of ground power to the aircraft.

* * * * *